United States Patent
Miyakawa et al.

(10) Patent No.: US 7,029,610 B2
(45) Date of Patent: Apr. 18, 2006

(54) PROCESS FOR PRODUCING POLYURETHANE-FOAM PRODUCT MOLDED INTEGRALLY WITH INSERT AND EXPANSION-MOLDING MOLD FOR THE SAME

(75) Inventors: Shinji Miyakawa, Ichinomiya (JP); Juro Ueda, Inuyama (JP)

(73) Assignees: Tokai Rubber Industries, Ltd., Komaki (JP); Tokai Chmical Industries, Ltd., Komaki (JP)

( * ) Notice: Subject to any disclaimer, the term of this patent is extended or adjusted under 35 U.S.C. 154(b) by 184 days.

(21) Appl. No.: 10/184,915

(22) Filed: Jul. 1, 2002

(65) Prior Publication Data

US 2003/0020196 A1    Jan. 30, 2003

(30) Foreign Application Priority Data

Jul. 26, 2001    (JP)    ............... 2001-225565

(51) Int. Cl.
*B29C 44/06* (2006.01)
*B29C 44/12* (2006.01)

(52) U.S. Cl. .................... 264/46.4; 264/276
(58) Field of Classification Search ............... 264/46.4, 264/276
See application file for complete search history.

(56) References Cited

U.S. PATENT DOCUMENTS

| | | | | |
|---|---|---|---|---|
| 4,959,184 A | * | 9/1990 | Akai et al. | 264/40.3 |
| 5,114,639 A | * | 5/1992 | Kurz et al. | 264/46.6 |
| 5,356,580 A | * | 10/1994 | Clark et al. | 264/51 |
| 5,660,771 A | * | 8/1997 | Dunfee et al. | 264/46.4 |
| 6,375,878 B1 | * | 4/2002 | Gray et al. | 264/46.5 |

FOREIGN PATENT DOCUMENTS

| | | |
|---|---|---|
| DE | 33 01 677 | 7/1984 |
| DE | 250 496 | 10/1987 |
| DE | 196 17 284 | 11/1997 |
| JP | 62-279154 | 12/1987 |
| JP | 6-339935 | 12/1994 |
| JP | 8-155986 | 6/1996 |
| JP | 8-187737 | 7/1996 |
| JP | 9-11248 | 1/1997 |
| JP | 9-134179 | 5/1997 |
| JP | 10-205352 | 8/1998 |

\* cited by examiner

*Primary Examiner*—Allan R. Kuhns
(74) *Attorney, Agent, or Firm*—Oblon, Spivak, McClelland, Maier & Neustadt, P.C.

(57) ABSTRACT

In a process for producing a polyurethane-foam product molded integrally with an insert, wherein a molded body, including a substrate and a polyurethane-foam molded body being molded integrally with the substrate, is produced, the substrate being disposed in an expansion-molding mold as the insert, a fine groove-shaped polyurethane-foam relief groove and a polyurethane-foam adjuster are formed in an end of the substrate and/or a mold surface of the expansion-molding mold which contacts with the substrate. The relief groove communicates with a cavity of the mold. The adjuster communicates with the relief groove, and has a volume larger than that of the relief groove. The relief groove and the adjuster can control the pressure exerted within the cavity. Polyurethane foam, which is formed by the relief groove and the adjuster, adheres to molded product. Therefore, it is possible to obviate the deflashing operation. An expansion-molding mold therefor is also disclosed.

10 Claims, 3 Drawing Sheets

PROCESS FOR PRODUCING POLYURETHANE-FOAM PRODUCT MOLDED INTEGRALLY WITH INSERT AND EXPANSION-MOLDING MOLD FOR THE SAME

BACKGROUND OF THE INVENTION

1. Field of the Invention

The present invention relates to a process for producing a polyurethane-foam molded product and an expansion-molding mold therefor. In the production process, a substrate, which makes at least one of a core member and a skin, is disposed in an expansion-molding mold, and the polyurethane-foam molded product is formed so as to integrally adhere to the substrate. More particularly, it relates to a process for producing a polyurethane-foam molded product, by which the man-hour requirements for removing the flashes from the resultant polyurethane-foam molded product can be reduced, and an expansion-molding mold therefor.

2. Description of the Related Art

Automobiles comprise many vibrating component members in which engines are principal one of such component members. To reduce the noises, which are generated by their vibrations, is one of the assignments to automobile engineers. Hence, it has been carried out disposing soundproof covers, which cover the noise sources. For example, in Japanese Unexamined Patent Publication (KOKAI) No. 10-205,352, there is disclosed a soundproof cover, which is constituted by a hard sound insulation layer and a sound absorption layer. The hard sound insulation layer is formed of a resin or steel plate. The sound absorption layer is laminated on one of opposite surfaces of the sound insulation layer which faces a noise source, and is formed of a polymer foamed substance. In this soundproof cover, the sound insulation layer insulates the sounds, which come from the noise source, and the sound absorption layer absorbs the sounds, which come from the noise source.

Namely, the sound waves, which are generated by the noise source, are absorbed by the sound absorption layer to a certain extent when they pass through the sound absorption layer. The rest of the sound waves, which are not absorbed, arrive at the sound insulation layer. Since it is difficult for the sound waves to pass through the hard sound insulation layer, the sound waves are reflected at the sound insulation layer and pass through the sound absorption layer again. Therefore, the sound waves are reflected repeatedly between the noise source and the sound insulation layer so that they are absorbed every time they pass through the sound absorption layer. Accordingly, it is possible to effectively carry out soundproofing.

Moreover, in Japanese Unexamined Patent Publication (KOKAI) No. 9-134,179, there is disclosed another soundproof cover. In this soundproof cover, a sound absorption layer is formed so as to conform to a superficial configuration of a noise source. Moreover, the sound absorption layer is disposed so as to adhere to the noise source. When the sound absorption layer is thus adhered to the noise source, no clearance arises between the soundproof cover and the noise source. Consequently, it is possible to inhibit the noises from leaking through such a clearance.

In order to produce such soundproof covers, it is possible to independently form the sound insulation layer and the sound absorption layer, respectively, and bond them thereafter. However, it is more convenient to produce a soundproof cover in the following manner. An insert, which makes the sound insulation layer, is first disposed in an expansion-molding mold, and then the sound absorption layer is molded integrally with the sound insulation layer by polyurethane expansion molding.

However, when the sound insulation layer is disposed in the expansion-molding mold as an insert and the sound absorption layer is formed integrally therewith, it is inevitable that the polyurethane foam intrudes between the insert and the mold surface so that the flashes arise. It is the problem associated with the sealing accuracy of the expansion-molding mold. However, even if the sealing accuracy is enhanced, the foaming gases cannot be leaked out completely in turn so that the pores, which are usually referred to as the air reservoirs, have arisen.

In addition, the leakage of the foamed resin through the space between the insert and the mold surface often result in the film-shaped flashes, which deposit on the mold surface, in many cases. In these cases, it is necessary to carry out a step of removing the flashes from the expansion-molding mold, and accordingly the molding cycle should be terminated at the step so that a problem arises in that the productivity lowers.

Hence, in Japanese Unexamined Patent Publication (KOKAI) No. 6-339,935, there is set forth to form a gas let-out groove, which communicates a cavity with the outside of an expansion-molding mold, in the expansion-molding mold. The publication sets forth that, with such an arrangement, the polyurethane foam intrudes into the gas let-out groove to lower the foaming pressure so that it is possible to inhibit the flashes from arising. Moreover, it sets forth that the viscosity of the polyurethane foam rises when the polyurethane foam passes through the gas let-out groove, and thereby no polyurethane foam leaks.

However, even if the gas let-out groove is disposed in the aforementioned manner, it is extremely difficult to balance both of them, i.e., the inhibition of the flashes from arising and the leakage of the polyurethane foam to the outside of the expansion-molding mold, with good accuracy.

Namely, when the polyurethane foam, which flows through the gas let-out groove, exhibits a large fluidic resistance, there arises a case where the foaming pressure enlarges in the cavity so that the flashes arise on the other mold surfaces in which the gas let-out groove is not formed. On the contrary, when the polyurethane foam exhibits a small fluidic resistance, there arises a case where the foaming pressure lessens so that the underfills or sink marks appear on the molded product, or there arises a case where the polyurethane foam leaks to the outside of the expansion-molding mold. Moreover, the precision of expansion-molding molds, the clamping forces, the contents of polyurethane foams, the temperatures, and the like, affect the foaming pressure delicately, and influence upon the extent of molding. Therefore, by simply forming the gas let-out groove only, it is extremely difficult to inhibit not only the flashes from arising but also the polyurethane foam from leaking to the outside of the expansion-molding mold with good accuracy.

SUMMARY OF THE INVENTION

The present invention has been developed in view of these circumstances. It is therefore an object of the present invention to securely inhibit both of the generation of the flashes and the leakage of the polyurethane foam to the outside of the expansion-molding mold while preventing the underfills or sink marks.

A process according to the present invention for producing a polyurethane-foam product molded integrally with an insert can achieve the aforementioned object. It is a process for producing a polyurethane-foam product molded integrally with an insert, wherein a molded body, including a substrate and a polyurethane-foam molded body being molded integrally with the substrate, is produced, the substrate being disposed in an expansion-molding mold as the insert, and comprises the steps of: forming a fine groove-shaped polyurethane-foam relief groove and a polyurethane-foam adjuster in at least one of an end of the substrate and a mold surface of the expansion-molding mold which contacts with the substrate, the polyurethane-foam relief groove communicating with a cavity of the expansion-molding mold, the polyurethane-foam adjuster communicating with the polyurethane-foam relief groove and having a volume larger than that of the polyurethane-foam relief groove; and adjusting the leakage of polyurethane foam, which is foamed in the cavity, with the polyurethane-foam adjuster, and removing polyurethane foam, which is formed by the polyurethane-foam relief groove and the polyurethane-foam adjuster, from the expansion-molding mold in such a state that it is bonded integrally with the molded product.

It is further desired that the polyurethane foam, which is formed by the polyurethane-foam relief groove and the polyurethane-foam adjuster, can be removed from the expansion-molding mold in such a state that it is adhered to the substrate.

It is furthermore desired that at least one of the end of the substrate and the mold surface of the expansion-molding mold can be provided with a second polyurethane-foam relief groove which communicates the polyurethane-foam adjuster with the outside of the expansion-molding mold. It is moreover desired that the leakage of the polyurethane foam can flow through the second polyurethane-foam relief groove after providing a time lag following the flowing of the polyurethane foam through the polyurethane-foam relief groove.

Namely, in accordance with the present process for producing a polyurethane-foam product molded integrally with an insert, it is possible to securely inhibit both of the generation of the flashes and the leakage of the polyurethane foam to the outside of the expansion-molding mold while prohibiting the underfills or sink marks. Therefore, not only it is possible to reduce the man-hour requirements, but also it is possible to remarkably improve the productivity.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

In a process according to the present invention for producing a polyurethane-foam product molded integrally with an insert, a fine groove-shaped polyurethane-foam relief groove and a polyurethane-foam adjuster are formed in at least one of an end of a substrate and a mold surface of an expansion-molding mold which contacts with the substrate. The polyurethane-foam relief groove communicates with a cavity of the expansion-molding mold. The polyurethane-foam adjuster communicates with the polyurethane-foam relief groove, and has a volume larger than that of the polyurethane-foam relief groove. Therefore, the polyurethane foam, which is expanded to fill in the cavity, is first passed through the polyurethane-foam relief groove. Since the polyurethane-foam relief groove is formed as a fine groove shape, it exhibits a large fluidic resistance. Accordingly, the pressure does not lower sharply within the cavity so that the underfills or sink marks are inhibited. Then, the polyurethane foam, which has passed through the polyurethane-foam relief groove, enters the polyurethane-foam adjuster, which has a large volume. Thus, it is possible to let out the excessive gases from the cavity so that the pores are inhibited from arising.

Moreover, when the polyurethane foam enters the polyurethane-foam adjuster, which has a large volume, the pressure lowers adequately within the cavity. Consequently, the polyurethane foam is suppressed from entering between the insert and the mold surface so that the film-shaped flashes, which adhere to the mold surface, are inhibited from arising. Therefore, the step of removing the flashes is obviated, and thereby it is possible to improve the productivity without suffering from such a drawback that terminates the molding cycle.

Thereafter, in the present production process, the polyurethane foam, which is formed by the polyurethane-foam relief groove and the polyurethane-foam adjuster, is removed from the expansion-molding mold in such a state that it is bonded integrally with the molded product. Therefore, if the polyurethane foam at such a part is unnecessary, it is possible to readily remove it by trimming after the molded product is removed from the expansion-molding mold or by manually tearing off. Accordingly, the line tact is hardly affected adversely. In addition, even if the polyurethane foam at such a part is left in the molded product and if it does not cause any problem functionally, the molded product can make a final product as it is. Therefore, it is possible to reduce the man-hour requirements.

Further, the polyurethane-foam relief groove and the polyurethane-foam adjuster is formed in at least one of the end of the substrate and the mold surface of the expansion-molding mold which contacts with the substrate. Therefore, the polyurethane foam, which enters the polyurethane-foam relief groove and the polyurethane-foam adjuster, has many opportunities of contacting with the substrate. Since the polyurethane foam exhibits a high adhesiveness to the substrate in many cases, it is desirable to adhere the polyurethane foam, which is formed by the polyurethane-foam relief groove and the polyurethane-foam adjuster, to the substrate. When the polyurethane foam is put into a state in which it is bonded integrally with the substrate, it is inhibited from coming off the substrate so that the functional problems arise less.

Furthermore, when the polyurethane foam, which is formed by the polyurethane-foam relief groove and the polyurethane-foam adjuster, adheres to the substrate on the identical surface with the surface on which the polyurethane-foam molded product, which is formed in the cavity, exists, since such a surface is usually disposed on a rear side with respect to the decorative surface of the polyurethane-foam molded product, leaving the polyurethane foam as it is does not cause any problem. Therefore, it is possible to obviate the deflashing step itself so that the man-hour requirements are improved sharply. Moreover, even if an underfill occurs at the polyurethane-foam adjuster, since the polyurethane-foam adjuster is disposed on a rear side with respect to the decorative surface, leaving the underfill as it is does not cause any problem, either.

The polyurethane-foam relief groove and the polyurethane-foam adjuster can be formed in at least one of the end of the substrate and the mold surface of the expansion-molding mold which contacts with the substrate, or can be formed in both of them. Alternatively, grooves, which are formed in both of them, respectively, can be combined to form the polyurethane-foam relief groove and the polyurethane-foam adjuster. Note that, when the substrate has a sufficient thickness, it is desirable to form the polyurethane-foam relief groove and the polyurethane-foam adjuster in the substrate. With such an arrangement, since the polyurethane foam, which enters the polyurethane-foam relief groove and the polyurethane-foam adjuster, contacts with the substrate over a large contacting area, it adheres on the side of the substrate. Accordingly, it is possible to securely inhibit the polyurethane foam from adhering and residing on the mold surface. On the other hand, when the substrate has a thin thickness, the polyurethane-foam relief groove and the polyurethane-foam adjuster can be formed in the mold surface.

The polyurethane-foam relief groove can be formed so as to communicate with portions of the cavity in which the gases are especially likely to reside. Alternatively, it is possible to form a plurality of the polyurethane-foam relief grooves at predetermined intervals on the entire periphery of the cavity.

Moreover, the polyurethane-foam adjuster can be formed so as to communicate with the polyurethane-foam relief groove and to have a volume large than that of the polyurethane-foam relief groove. For example, it is formed as a plurality of concaves which communicate with the polyurethane-relief groove. Alternatively, a groove, which extends over a long distance with a cross sectional area substantially identical with that of the polyurethane-foam relief groove, can make the polyurethane-foam adjuster.

When it is not possible to enlarge the volume of the polyurethane-foam adjuster due to the spacial limitations, and so forth, it is preferable to form a second polyurethane-foam relief groove which communicates the polyurethane-foam adjuster with the outside of the expansion-molding mold. With such an arrangement, it is possible to readily let out the gases held in the cavity, and accordingly it is possible to more securely inhibit both of the flashes and the pores from arising. However, when the second polyurethane-foam relief groove is stuck before the polyurethane-foam adjuster is filled completely, there occurs a case where the gases reside within the cavity to form the pores, or there occurs a case where the flashes arise on the outside of the expansion-molding mold or the mold surface. Hence, it is desirable to arrange so that the leakage of the polyurethane foam flows through the second polyurethane-foam relief groove after providing a time lag following the flowing of the polyurethane foam through the polyurethane-foam relief groove. With such an arrangement, it is possible to much more securely inhibit both of the flashes and the pores from arising.

In order to arrange so that the leakage of the polyurethane foam flows through the second polyurethane-foam relief groove after providing a time lag following the flowing of the polyurethane foam through the polyurethane-foam relief groove, it is possible to exemplify the following methods, and so on. For example, the first polyurethane-foam relief groove, which communicates with the cavity, and the second polyurethane-foam relief groove are formed as such shapes, respectively, that they are disposed so as not to be linear with each other and the pressure, which is exerted onto the first polyurethane-foam relief groove, is not directly applied to the second polyurethane-foam relief groove. Moreover, when the cross sectional area of the second polyurethane-foam relief groove is made smaller than that of the first polyurethane-foam relief groove, the fluidic resistance is enlarged so that it is possible to produce an effect of inhibiting the flashes from arising on the outside of the expansion-molding mold.

The substrate can be a core member, such as a hard substrate, and the like. Alternatively, a skin, which constitutes a decorative surface, can make the substrate. Moreover, both of the core member and the skin can make the substrate. In this case, the polyurethane foam, which is formed by the polyurethane-foam relief groove and the polyurethane-foam adjuster, can be adhered to both of the core member and the skin, or can be adhered to either one of the core member and the skin. When the substrate is hard and has a heavy thickness, as described above, it is desirable to form the polyurethane-foam relief groove and the polyurethane-foam adjuster in the substrate. On the other hand, when the substrate has a thin thickness or when the skin makes the substrate, it is desirable to form the polyurethane-foam relief groove and the polyurethane-foam adjuster in the mold surface of the expansion-molding mold which contacts with the rear surface side of the substrate.

Hereinafter, the present invention will be described in detail with reference to specific examples.

EXAMPLE NO. 1

Figure 1:
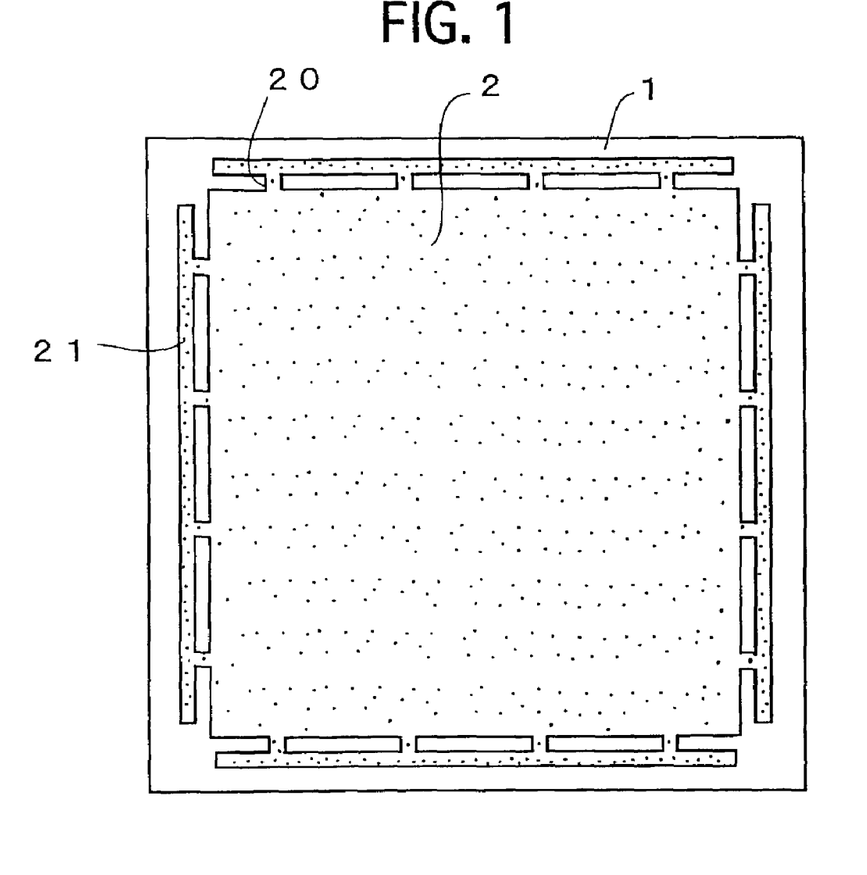
FIG. 1 is a plan view of a polyurethane-foam product molded integrally with an insert which was produced in an example according to the present invention.
Figure 2:
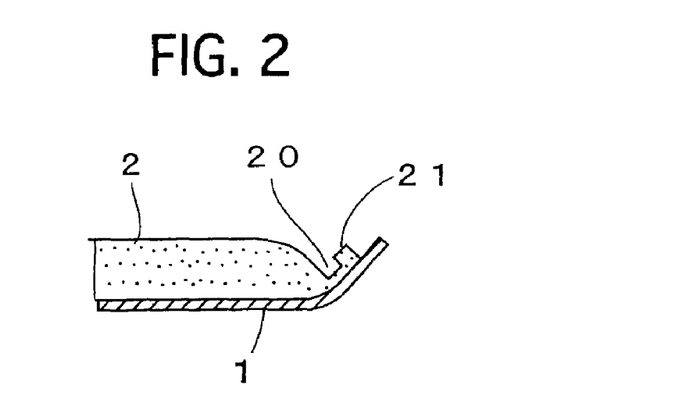
FIG. 2 is a major cross sectional view of FIG. 1.

FIG. 1 illustrates a plan view of an integrally molded product which was formed in Example No. 1. FIG. 2 illustrates its major cross sectional view. The integrally molded product comprised a substrate 1 and a polyurethane foam 2. The substrate 1 was made of a metal, and was formed as a quadrangle shape. The polyurethane foam 2 was formed on the rear surface side of the substrate 1. Moreover, the polyurethane foam 2 was formed as a substantially quadrangle shape. In the polyurethane foam 2, four thread-shaped portions 20 were formed at substantially equal intervals to project from the respective sides. The thread-shaped portions 20 were formed by polyurethane-foam relief grooves 30, which will be described later. At the leading ends of the thread-shaped portions 20, string-shaped portions 21 were formed. The string-shaped portions 21 were formed by polyurethane-foam adjusters 31, which will be described later, connected four of the thread-shaped portions 20, respectively, and had a thickness thicker than that of the thread-shaped portions 20. Note that the thread-shaped portions 20 and the string-shaped portions 21 adhered integrally to the rear surface side of the substrate 1, respectively.

Figure 3:
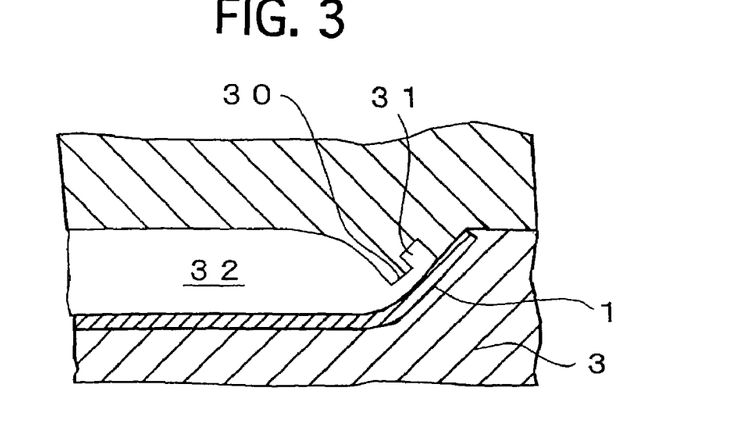
FIG. 3 is a major cross sectional view of an expansion-molding molding mold which was used in the example according to the present invention.

In order to produce the integrally molded product, a substrate 1 was formed first by pressing, and was disposed in an expansion-molding mold 3 as illustrated in FIG. 3. On the mold surface of the expansion-molding mold 3 which contacted with the rear surface of the ends of the substrate 1, there were formed polyurethane-foam relief grooves 30 and polyurethane-foam adjusters 31. The polyurethane-foam relief grooves 30 had a cross sectional area of 2 mm$^2$, respectively. The polyurethane-foam adjusters 31 had a volume of 1 cm$^3$, respectively. Moreover, the expansion-molding mold 3 had a cavity 32 whose volume was 400 cm$^3$. The polyurethane-foam relief groove 30 was formed in a quantity of four on the respective sides of the cavity 32, respectively. The polyurethane-foam adjuster 31 connected four of the polyurethane-foam relief grooves 30, respectively.

Then, raw materials (i.e., a diisocyanate compound and a polyether-based polymer polyol, amine or water) for the polyurethane foam 2 were charged into the cavity 32. When the expansion molding begun, the resulting polyurethane foam, which filled in and expanded within the cavity 32, flowed through the polyurethane-foam relief grooves 30. Since the polyurethane-foam relief grooves 30 were formed as a fine groove shape, they exhibited a high fluidic resistance. Accordingly, the pressure within the cavity 32 was sustained high enough so that the underfills or sink marks were inhibited.

When the pressure within the cavity 32 was too high, the polyurethane foam entered the polyurethane-foam adjusters 31 by way of the polyurethane-foam relief grooves 31. Since the polyurethane-foam adjusters 31 had a sufficiently large volume, the gases resided in the polyurethane-foam adjusters 32. Consequently, it was possible to let out the gases from the cavity 32, and thereby the pores were inhibited from arising. Moreover, since the polyurethane foam, which was to be the flashes, escaped from the cavity 32 into the polyurethane-foam relief grooves 30 and the polyurethane-foam adjusters 31, no flashes arose.

When the polyurethane foam 2 was removed from the expansion-molding mold after completing the expansion molding, the thread-shaped portions 20 and the string-shaped portions 21 were removed from the expansion-molding mold 3 in such a state that they adhered to the substrate 1. Accordingly, nothing was left over on the expansion-molding mold 3. Moreover, since no flashes arose, the deflashing step was obviated. Consequently, it was possible not only to improve the productivity but also to remarkably reduce the man-hour requirements. In addition, even if the underfills or sink marks occurred in the string-shaped portions 21, the surface of the substrate 1, on which the polyurethane foam 2 was formed, was disposed on an opposite side with respect the decorative surface of the integrally molded product. Therefore, there arose no problem in terms of the decorativeness.

Note that, in Example No. 1, the polyurethane-foam adjusters 31 were disposed on the respective sides of the cavity 32, respectively, and that the respective polyurethane-foam adjusters 31 connected four of the polyurethane-foam relief grooves 30, respectively. However, it is possible to provide the respective polyurethane-foam relief grooves 30 with the polyurethane-foam adjuster 31, respectively. Moreover, in Example No. 1, the polyurethane-foam adjusters 31 had a large volume, respectively. However, as far as a volume is given to the same extent as that of the polyurethane-foam adjusters 31, it is possible to effect similar advantages even when a narrow long passage makes the polyurethane-foam adjuster.

In addition, the polyurethane-foam adjusters 31 of the respective sides of the cavity 32 can be connected with each other. On the contrary, one polyurethane-foam adjuster 31 can be disposed independently with respect to one polyurethane-foam relief groove 30.

EXAMPLE NO. 2

Figure 4:
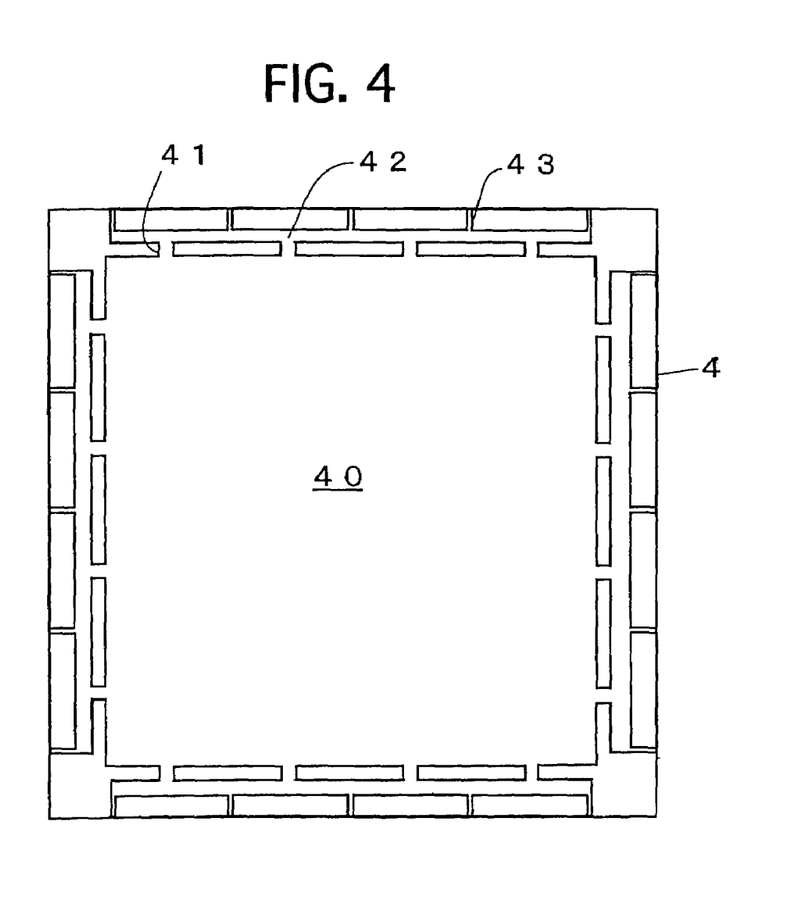
FIG. 4 is a plan view of a mold surface of an expansion-molding mold which was used in a second example according to the present invention.

FIG. 4 illustrates a mold surface of an expansion-molding mold 4 which was used in Example No. 2. In this expansion-molding mold 4, there were formed a cavity 40, a plurality of polyurethane-foam relief grooves 41 and a plurality of polyurethane-foam adjusters 42. The cavity 40 was formed as a substantially quadrangle shape. The polyurethane-foam relief grooves 41 extended from the respective sides of the cavity 40 at substantially equal intervals. The polyurethane-foam adjusters 42 connected four of the polyurethane-foam relief grooves 41, respectively. The arrangements described so far is the same as those of the expansion-molding mold 3 which was used in Example No. 1. However, in Example No. 2, a plurality of second polyurethane-foam relief grooves 43 were formed. The second polyurethane-foam relief grooves 43 communicated the polyurethane-foam adjusters 42 with the outside of the expansion-molding mold 4. The polyurethane-foam relief grooves 41 had a cross sectional area of 2 mm$^2$, respectively. The polyurethane-foam adjusters 42 had a volume of 1 cm$^3$, respectively. The second polyurethane-foam relief grooves 43 had a cross sectional area of 1 mm$^2$, respectively. Moreover, the polyurethane-foam adjusters 42 connected four of the polyurethane-foam relief grooves 41, and was formed in a quantity of four on the respective sides of the cavity 40, respectively. The second polyurethane-foam relief groove 43 was formed in a quantity of five in total at the opposite ends of the polyurethane-foam adjusters 42 as well as between the polyurethane-foam relief grooves 41.

Then, raw materials (i.e., a diisocyanate compound and a polyether-based polymer polyol, amine or water) for forming a polyurethane foam were charged into the cavity 40. When the expansion molding begun, the resulting polyurethane foam, which filled in and expanded within the cavity 32, flowed through the polyurethane-foam relief grooves 41. Since the polyurethane-foam relief grooves 41 were formed as a fine groove shape, they exhibited a high fluidic resistance. Accordingly, the pressure within the cavity 40 was sustained high enough so that the underfills or sink marks were inhibited.

When the pressure within the cavity 40 was too high, the polyurethane foam entered the polyurethane-foam adjusters 42 by way of the polyurethane-foam relief grooves 41. Since the polyurethane-foam adjusters 42 had a sufficient volume, the gases resided in the polyurethane-foam adjusters 42. Consequently, it was possible to let out the gases from the cavity 40, and thereby the pores were inhibited from arising. Moreover, since the polyurethane foam, which was to be the flashes, escaped from the cavity 40 into the polyurethane-foam relief grooves 41 and the polyurethane-foam adjusters 42, no flashes arose.

Then, when the pressure within the cavity 40 was extremely high, the polyurethane foam flowed into the second polyurethane-foam relief grooves 43, and the gases escaped to the outside of the expansion-molding mold 4 through the second polyurethane-foam relief grooves 43. Therefore, the pores were inhibited from arising in the cavity 40. Since the second polyurethane-foam relief grooves 43 were formed away from the polyurethane-foam relief grooves 41, the polyurethane foam flowed into the polyurethane-foam adjusters 42 after it passed through the polyurethane-foam relief grooves 41, and it flowed into the second polyurethane relief grooves 43 after providing a time lag following the flowing through the polyurethane-foam relief grooves 41. Therefore, the polyurethane foam cured mostly until then. Accordingly, the polyurethane foam hardly leaked to the outside of the expansion-molding mold 4 through the second polyurethane-foam relief grooves 43.

When the thus produced polyurethane foam was removed from the expansion-molding mold 4 after completing the expansion molding, the thread-shaped portions, the string-shaped portions and the second thread-shaped portions, which were formed by the second polyurethane-foam relief grooves 43, were removed from the expansion-molding mold 4 in such a state that they adhered to the substrate. Accordingly, nothing was left over on the expansion-molding mold 4. Moreover, since no flashes arose, the deflashing step was obviated. Consequently, it was possible not only to improve the productivity but also to remarkably reduce the man-hour requirements. In addition, even if the second thread-shaped portions were formed on their way to the end surfaces of the substrate, the surface of the substrate, on which the polyurethane foam was formed, was disposed on an opposite side with respect to the decorative surface of the integrally molded product. Therefore, there arose no problem in terms of the decorativeness.

EXAMPLE NO. 3

Figure 5:
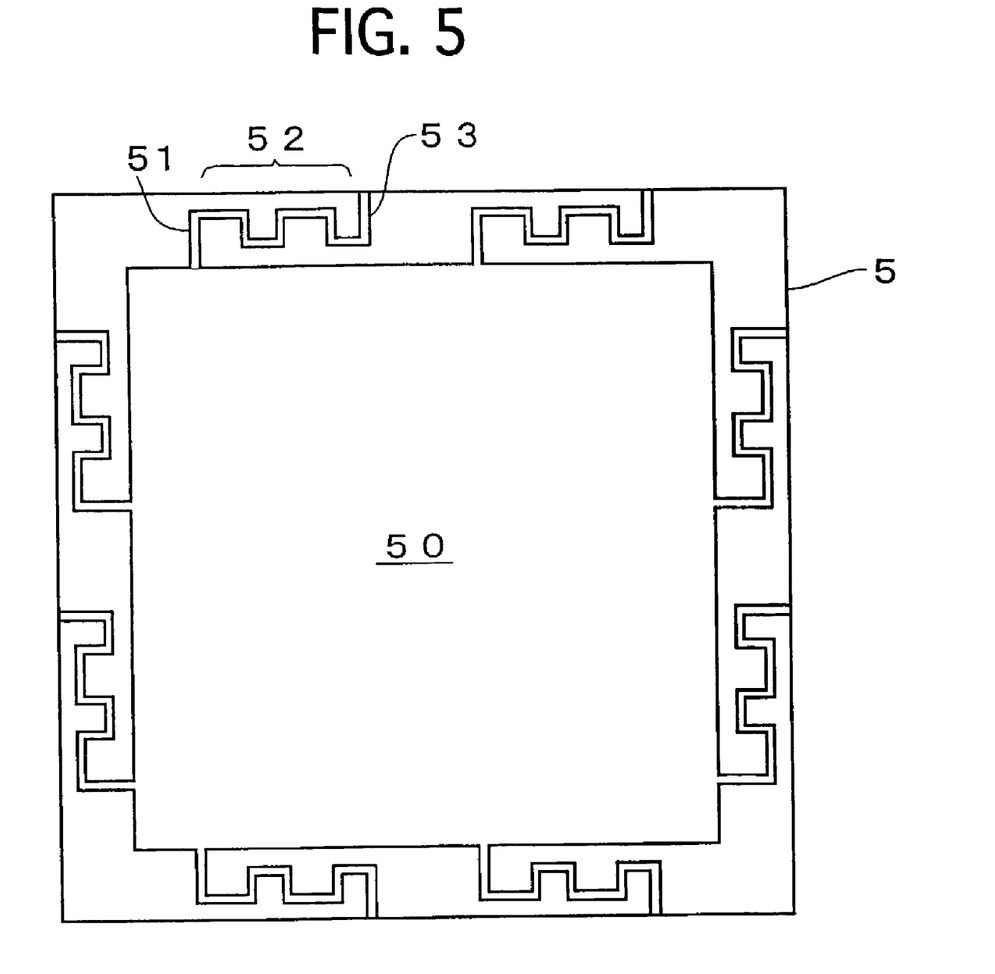
FIG. 5 is a plan view of a mold surface of an expansion-molding mold which was used in a third example according to the present invention.

FIG. 5 illustrates a mold surface of an expansion-molding mold 5 which was used in Example No. 3. In Example 3, two polyurethane-foam relief grooves 51 extended from the respective sides of a cavity 50, respectively. The polyurethane-foam relief grooves 51 communicated with a wave-shaped bent groove 52, respectively. The bent grooves 52 communicated with a second polyurethane-foam relief groove 53, respectively. The polyurethane-foam relief grooves 51, the bent grooves 52 and the second polyurethane-foam relief grooves 53 had a cross sectional area of 2 mm$^2$, respectively, which was identical with each other. However, the bent grooves 52 were bent by a plurality of times between the end surfaces and cavity 50 of the expansion-molding mold 5. Thus, the bent grooves 52 had a volume as large as 1 cm$^3$.

In Example No. 3, since the bent grooves 52 acted in the same manner as the polyurethane-foam adjusters 42 of Example No. 2, they operated and produced advantages similarly to Example No. 2. If the volume of the bent grooves 52 is less than the volume of the polyurethane-foam adjusters 42, it is possible to compensate the difference by further bending the bent grooves 52 so as to enlarge the entire length. Moreover, in Example No. 3, the advancing direction of the wave shape of the bent grooves 52 was disposed along one of the sides of the cavity 50. However, in a case where the distance between the cavity 50 and end surfaces of the expansion-molding mold 5 is large, it is possible to dispose the advancing direction of the wave shape of the bent grooves 52 perpendicularly to one of the sides of the cavity 50.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a polyurethane-foam product molded integrally with an insert, wherein a molded body, including a substrate and a polyurethane-foam molded body being molded integrally with the substrate, is produced, the substrate being disposed in an expansion-molding mold as the insert, the process comprising the steps of:

forming a fine groove-shaped polyurethane-foam relief groove and a polyurethane-foam adjuster in at least one of an end of the substrate and a mold surface of the expansion-molding mold which contacts with the substrate, the polyurethane-foam relief groove communicating with a cavity of the expansion-molding mold, the polyurethane-foam adjuster being in communicating with the polyurethane-foam relief groove and having a volume larger than that of the polyurethane-foam relief groove; and adjusting the leakage of polyurethane foam, which is foamed in the cavity, with the polyurethane-foam adjuster, and removing polyurethane foam, which is formed by the polyurethane-foam relief groove and the polyurethane-foam adjuster, from the expansion-molding mold in such a state that it is bonded integrally with said molded product;

wherein the substrate is a plate-like cover and has a decorative first side and a polyurethane-foam molded body molded on a second side.

2. The process for producing a polyurethane-foam product molded integrally with an insert according to claim 1, wherein the polyurethane foam, which is formed by the polyurethane-foam relief groove and the polyurethane-foam adjuster, is removed from the expansion-molding mold in such a state that it is adhered to said substrate.

3. The process for producing a polyurethane-foam product molded integrally with an insert according to claim 1, wherein at least one of said end of the substrate and said mold surface of the expansion-molding mold is provided with a second polyurethane-foam relief groove which communicates said polyurethane-foam adjuster with the outside of said expansion-molding mold.

4. The process for producing a polyurethane-foam product molded integrally with an insert according to claim 3, wherein said leakage of the polyurethane foam flows through said second polyurethane-foam relief groove after providing a time lag following the flowing of the polyurethane foam through said polyurethane-foam relief groove.

5. The process for producing a polyurethane-foam product molded integrally with an insert according to claim 4, wherein said polyurethane-foam relief groove and said second polyurethane-foam relief groove are disposed in a non-linear manner.

6. The process for producing a polyurethane-foam product molded integrally with an insert according to claim 3, wherein said second polyurethane-foam relief groove has a small cross sectional area than that of said polyurethane-foam relief groove.

7. The process for producing a polyurethane-foam product molded integrally with an insert according to claim 1, wherein a plurality of said polyurethane-foam relief grooves are disposed at predetermined intervals around said cavity.

8. A process for producing a polyurethane-foam product molded integrally with an insert, wherein a molded body, including a substrate and a polyurethane-foam molded body being molded integrally with the substrate, is produced, the substrate being disposed in an expansion-molding mold as the insert, the process comprising the steps of:

forming a fine groove-shaped polyurethane-foam relief groove and a polyurethane-foam adjuster in at least one of an end of the substrate and a mold surface of the expansion-molding mold which contacts with the substrate, the polyurethane-foam relief groove communicating with a cavity of the expansion-molding mold, the polyurethane-foam adjuster being in communication with the polyurethane-foam relief groove and having a volume larger than that of the polyurethane-foam relief groove; and adjusting the leakage of polyurethane foam, which is foamed in the cavity, with the polyurethane-foam adjuster, and removing polyurethane foam, which is formed by the polyurethane-foam relief groove and the polyurethane-foam adjuster, from the expansion-molding mold in such a state that it is bonded integrally with said molded product;

wherein at least one of said end of the substrate and said mold surface of the expansion-molding mold is provided with a second polyurethane-foam relief groove which communicates said polyurethane-foam adjuster with the outside of said expansion-molding mold; and wherein said leakage of the polyurethane foam flows through said second polyurethane-foam relief groove after providing a time lag following the flowing of the polyurethane foam through said polyurethane-foam relief groove.

9. A process for producing a polyurethane-foam product molded integrally with an insert, wherein a molded body, including a substrate and a polyurethane-foam molded body being molded integrally with the substrate, is produced, the substrate being disposed in an expansion-molding mold as the insert, the process comprising the steps of:

forming a fine groove-shaped polyurethane-foam relief groove and a polyurethane-foam adjuster in at least one of an end of the substrate and a mold surface of the expansion-molding mold which contacts with the substrate, the polyurethane-foam relief groove communicating with a cavity of the expansion-molding mold, the polyurethane-foam adjuster being in communication with the polyurethane-foam relief groove and having a volume larger than that of the polyurethane-foam relief groove; and adjusting the leakage of polyurethane foam, which is foamed in the cavity, with the polyurethane-foam adjuster, and removing polyurethane foam, which is formed by the polyurethane-foam relief groove and the polyurethane-foam adjuster, from the expansion-molding mold in such a state that it is bonded integrally with said molded product;

wherein at least one of said end of the substrate and said mold surface of the expansion-molding mold is provided with a second polyurethane-foam relief groove which communicates said polyurethane-foam adjuster with the outside of said expansion-molding mold; and wherein said second polyurethane-foam relief groove has a smaller cross sectional area than that of said polyurethane-foam relief groove.

10. The process for producing a polyurethane-foam product molded integrally with an insert according to claim 8, wherein said polyurethane-foam relief groove and said second polyurethane-foam relief groove are disposed in a non-linear manner.

* * * * *

UNITED STATES PATENT AND TRADEMARK OFFICE
CERTIFICATE OF CORRECTION

PATENT NO. : 7,029,610 B2  Page 1 of 1
APPLICATION NO. : 10/184915
DATED : April 18, 2006
INVENTOR(S) : Miyakawa et al.

It is certified that error appears in the above-identified patent and that said Letters Patent is hereby corrected as shown below:

On the title page, Item (73), the Assignee is incorrect. Item (73) should read:
--(73) Assignees: Tokai Rubber Industries, Ltd., Komaki (JP);
                    Tokai Chemical Industries, Ltd., Komaki (JP) --

Signed and Sealed this

Eighth Day of August, 2006

JON W. DUDAS
*Director of the United States Patent and Trademark Office*